Oct. 4, 1932.  W. D. HUBERT  1,881,080
AIRCRAFT PROPELLER
Filed Dec. 4, 1930  2 Sheets-Sheet 1
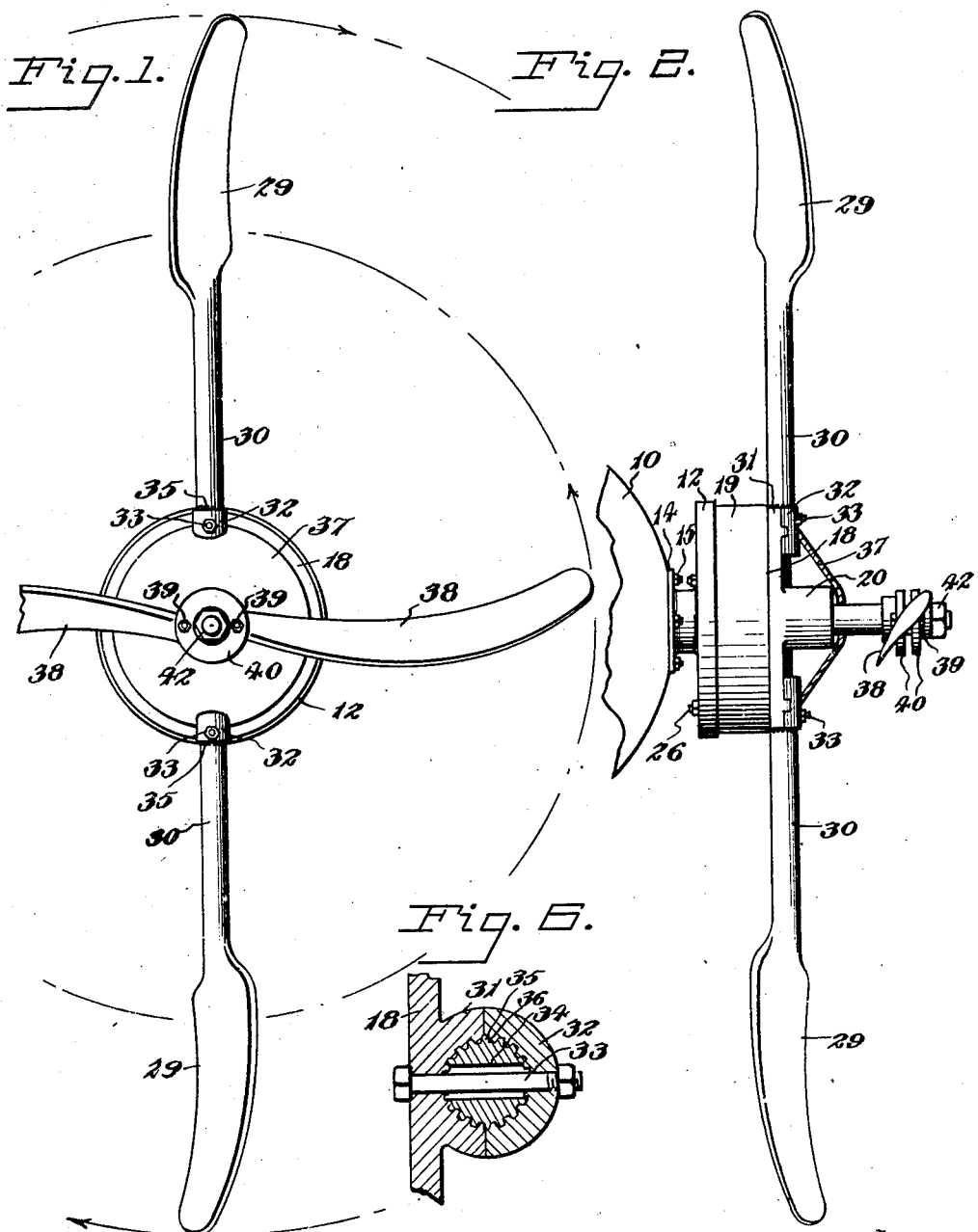

Oct. 4, 1932.   W. D. HUBERT   1,881,080
AIRCRAFT PROPELLER
Filed Dec. 4, 1930   2 Sheets-Sheet 2

Inventor
W. D. Hubert
By Lacey & Lacey,
Attorneys

Patented Oct. 4, 1932

1,881,080

UNITED STATES PATENT OFFICE

WILLIAM D. HUBERT, OF JOLIET, ILLINOIS

AIRCRAFT PROPELLER

Application filed December 4, 1930. Serial No. 500,088.

This invention relates to propellers for aircraft.

The principal object of the invention is to provide a dual propeller assembly comprising propellers disposed in line and differing in length, pitch and speed, whereby efficiency is greatly increased due to diminished slip of the large rear propeller as compared to an ordinary propeller of equal length, and better leverage exerted by the shorter faster blades of the front propeller than the leverage exerted by the hub portions of the ordinary propellers.

An airplane propeller is a screw that bores its way through the air at the rate, for instance, of about five and one-half feet advance per revolution of a seven-foot propeller. The pitch of the blades varies from a few degrees at the tips to nearly 90 degrees at the hub. Thus, the pitch at the hub is nearly parallel to the line of flight, and that part of the blades cannot obtain a grip on the air. Consequently, the tips of the blades must slip, resulting in decreased traction and waste of power transmitted from the motor.

Moreover, it is well known that a plane, such as the face of a propeller blade, is not efficient at a greater angle than 25 degrees. Consequently, the steep pitch near the hub produces merely a churning effect and is of no value for traction purposes, in addition to wasting horsepower.

Furthermore, the tips of the blades of a seven-foot propeller at 2200 R. P. M. travel through the air at a speed of over 900 feet per second, which is conceded much too fast for efficiency. Yet, most modern motors are designed to turn that fast, if not faster, which is not economical.

To obviate the above enumerated disadvantages, the present invention provides a large propeller disposed near the engine and driven from the propeller shaft by reduction gearing, this propeller utilizing only the outer portions of the blades for traction purposes, the inner portions being merely tubular shafts. A small propeller is fixed to the propeller shaft in front of the large propeller and the blades are substantially the length of said tubular shafts. The pitch of the small propeller is less than that of the large propeller, but far less steep than that ordinarily to be found in the hub portions of the usual aircraft propellers The small propeller covers the inner portion of the area covered by the large propeller and since the pitch is such as to eliminate churning, the small propeller bores through the center of the air streams with a more suitable pitch than ordinary propellers. The large propeller will have consequently less slip than ordinarily and the efficiency of the propeller assembly will be correspondingly increased by this factor, as well as by the greater traction exerted by the shorter faster blades of the front propeller than ordinarily.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification:

Figure 1 is a front elevation of my improved propeller assembly,

Fig. 2 is a side elevation of the propeller assembly,

Figure 3:
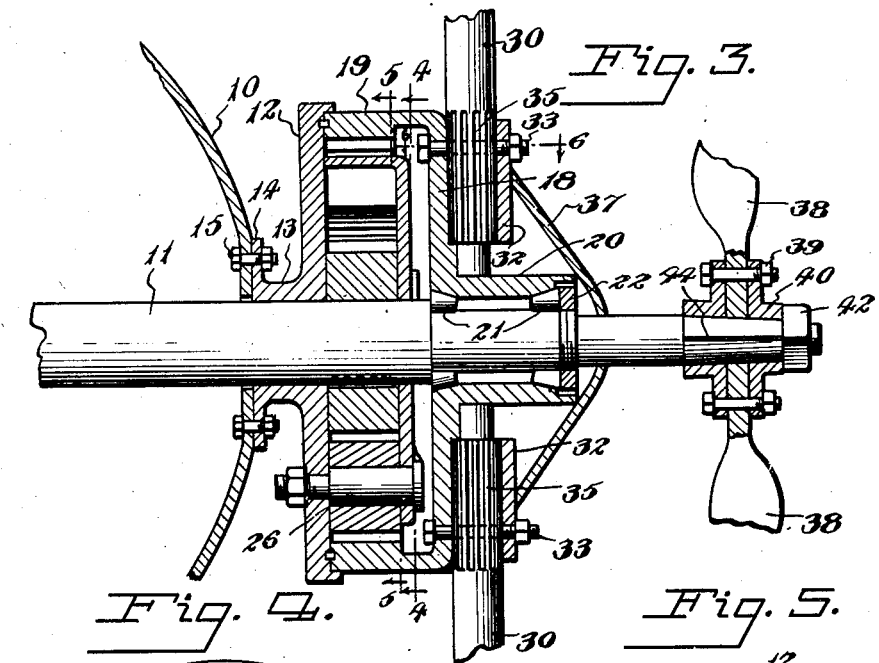
Figure 4:
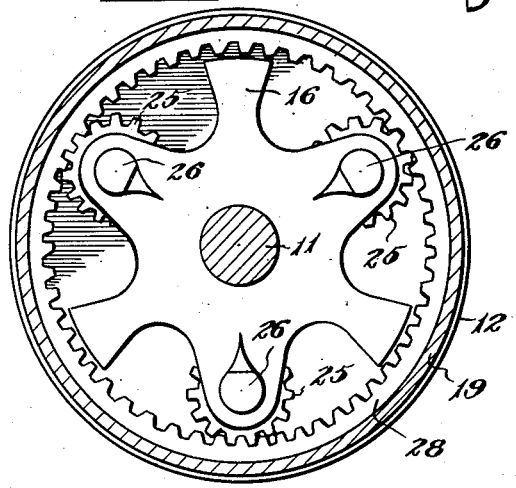
Figure 5:
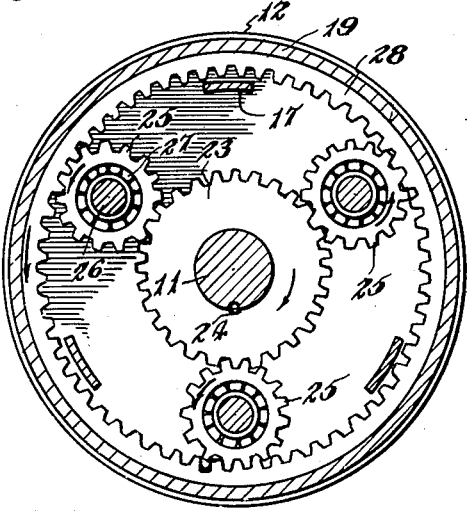
Figure 7:
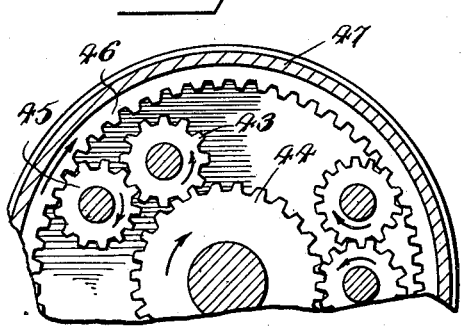

Fig. 3 is a detail cross sectional view showing the hub mountings of the front and rear propellers, Fig. 4 is a cross sectional view on the line 4—4 of Fig. 3, Fig. 5 is a cross sectional view on the line 5—5 of Fig. 3, Fig. 6 is a cross sectional view on the line 6—6 of Fig. 3 showing the means for adjusting the pitch of the large propeller blades, and Fig. 7 is a detail cross sectional view similar to Fig. 5 but showing an idle gear for reversing the direction of rotation of the large propeller blades.

Referring now to the drawings in which like characters of reference designate similar parts in the various views, 10 designates the front end of the engine crank case and 11 designates the propeller shaft. 12 designates the rear half of the gear case, the same being provided with a bearing 13 in which the propeller shaft 11 turns. The bearing terminates in a flange 14. Bolts 15 are passed through the flange and through the motor crank case to rigidly secure the rear half 12 of the gear case in place. A spider 16 of the general shape shown in Fig. 4 is preferably cast integral with the rear half 12 of the gear case, or may be welded at spaced points to the gear case, as shown at 17 in Fig. 5.

The front half 18 of the gear case is preferably cast with a bell 19 to form the sides of the gear case, and is also formed with a hub 20 adapted to fit over the propeller shaft 11. The hub is milled to receive roller bearings 21 and is also recessed to receive a lock nut 22 which holds the front half and rear half of the gear case assembled on the shaft. The hub and front half of the gear case, it will be observed, is free to be rotated reversely to the propeller shaft 11 by reduction gears, as will now be described.

By referring to Fig. 5, it will be seen that a gear 23 is keyed, as shown at 24, to the propeller shaft 11. Preferably, three idle gears 25 are mounted on stub shafts 26 journaled in suitable bearings in the spider 16 and rear half 12 of the gear case. Ball bearings 27 confined between the gears and their stub shafts reduce friction. These idle gears engage an inner ring gear 28 which is formed integral with the bell 19 of the front half of the gear case, or may be fixed to the latter in any preferred manner. The idle gears rotate the hub and bell and front half of the gear case in opposite direction to the propeller shaft and the gear ratios are such that the speed of said case is reduced to any desired extent to suit the motor with which it is designed to be used. Preferably, for the convenience of explanation, the reduction gearing is such as to reduce the speed of the rotatable half of the gear case to one-half the R. P. M. of the propeller shaft.

The propeller blades 29 of the large propeller are flat and preferably pitched to advance six feet per revolution and are each provided at the inner ends with a tubular shaft 30 which enters a corresponding socket carried radially on the front half 18 of the gear case. The socket preferably, as shown in Fig. 6, is formed integral at the rear side with the front half of the gear case 18, as shown at 31. The front half 32 of the socket is removably secured in place by a bolt 33. This bolt is passed through an oblong slot 34 formed in the shaft 30 and rigidly secures the propeller blade in the socket. As illustrated, the secured end of the shaft 30 is provided with longitudinal ribs 35 which engage in corresponding grooves 36 formed in the socket to permit of the pitch of the propeller blade being varied, as will be understood. The blade shafts 30 may be either tubular or solid, or may be stream lined, as desired.

A spinner 37 houses the hub 30 and sockets above described, to deflect air currents.

The front propeller blades 38 are bolted, as shown at 39, to a flanged hub 40 which is keyed, as shown at 41, to the end of the propeller shaft. A lock nut 42 is threaded onto the end of the shaft and secures the small front propeller in place.

The length of the blades 38 of the front propeller are substantially equal in length to the shafts 30 of the blades 29 of the large propeller. The pitch of the small propeller blades is preferably one-half that of the pitch of the large propeller blades, so that the small propeller will bore through the air in two revolutions the same distance as the large propeller blades 29 do in one revolution.

It will be observed that the small propeller is placed directly in front of the large propeller and is about two-thirds the length of the large propeller, so that it covers about half of the area covered by the large propeller. The blades of the small propeller are preferably pitched to advance three feet per revolution. They are of only one-half the pitch of the blades of the large propeller. It will be remembered that the larger propeller turns half as fast and advances six feet per revolution. It will be pointed out that only the tips of the large propeller are used for traction purposes, while the hub portions thereof are skeleton, that is, are merely shafts, while the area, described by these shafts during rotation of the propeller, is covered by the blades of the front propeller. It will be particularly pointed out that the pitch of the blades of the front propeller is such that churning is practically eliminated, while traction is promoted since the small propeller bores through the air stream adjacent the propeller shaft with a more suitable pitch than ordinary propellers, with resultant decreased slip of the large propeller and increased traction of the small propeller due to the gentle pitch of the latter being such as to gain greater leverage on the air than hitherto possible in propeller construction.

In order to fit the propeller assembly for airplanes that have already been built and constructed to compensate for the torque produced by the rotation of the propellers in the same direction, I provide intermediate idle gears 43, as best shown in Fig. 7, these gears connecting the propeller shaft gear 44 with the idle gears 45 which mesh with the ring gear 46 of the gear case 47. This train of gearing rotates the large propeller in the same direction as the propeller shaft.

From the above description, it is thought that the construction and operation of the invention will be clearly understood without further explanation.

Having thus described the invention, I claim:

1. An aircraft propeller assembly comprising a front propeller, a rear propeller, the rear propeller having blades set to a predetermined pitch, and having a central hub engaging portion of skeleton structure, the front propeller being of the same length as said skeleton structure, the pitch of the front propeller being substantially one-half that of the pitch of the rear propeller, and a reduction gear train for rotating the rear propeller oppositely to the front propeller at substantially one-half the speed of the front propeller.

2. An aircraft propeller assembly comprising a rear propeller, a propeller shaft, a gear case having a portion adapted to be fixed to the aircraft motor and having a front portion provided with a ring gear and rotatably mounted on said shaft, sockets on the rotatable portion of the gear case, radial shafts secured in said sockets and integral with the blades of said rear propeller, a reduction gear train in the fixed portion of said case engaging said gear ring for rotating said rear propeller reversely at reduced speed with respect to said shaft, and a front propeller fixed to said shaft and of such length as to extend to the ends of said radial shafts and of less pitch than the rear propeller.

3. An aircraft propeller assembly comprising a propeller shaft, a front propeller, a rear propeller, the blades of the rear propeller terminating at the inner ends in integral tubular shafts, a gear case having a portion idling on said propeller shaft and operatively connecting said tubular shafts, a reduction gear train in said case for rotating said idling section at reduced speed reversely from said propeller shaft, said blades being of suitable pitch to provide traction, a front propeller secured direct to said propeller shaft and of such length as to extend along said shafts to substantially the ends thereof, the blades of said front propeller being of less pitch than the said rear propeller blades.

4. An aircraft propeller assembly comprising a propeller shaft, a gear case within which said shaft is rotatably mounted, said gear case being formed of a front and a rear section, the front section being rotatable independently of the shaft, means for rigidly securing the rear section to a support, a spider carried by the rear section, idle gears carried by said spider, a gear carried by said shaft meshing with said idle gears, a ring gear carried by said front section meshing with said idle gears, radial sockets carried by said front section, radial tubular shafts secured in said sockets and terminating in propeller blades, and a propeller secured direct to said propeller shaft in advance of said tubular shafts and of sufficient length to extend along said tubular shafts substantially to the ends thereof, said propeller being of less pitch than said propeller blades.

5. An aircraft propeller assembly comprising a propeler shaft, a sectional gear case on said shaft, means for securing one section of said gear case stationary, a gear train operatively connecting the other section of said gear case to be rotated reversely from said shaft, sectional sockets carried by the rotatable section of said gear case, said sockets having longitudinal grooves, tubular shafts in said sockets having ribs fitting in said grooves, a bolt securing the sections of each socket together to rigidly secure said tubular shafts in said socket, said grooves and said ribs permitting adjustment of said tubular shafts, blades on the ends of said tubular shafts, and a front propeller of less pitch than said blades projecting along said tubular shafts substantially to the ends thereof and rigidly secured to said propeller shaft.

6. A propeller assembly comprising a gear case having a stationary rear section and a rotary front section carried by the rear section, a spider having radial legs abruptly directed rearwardly at the ends and terminally fixed to said rear section, idle gears journaled in said radial legs and in said rear section, a ring gear on said rotary section meshing with said idle gears, a propeller shaft, a gear on the propeller shaft meshing with said idle gears, the idle gears rotating said rotary section reversely from the propeller shaft at reduced speed, a short front propeller fixed to the propeller shaft, a long rear propeller carried by said rotary section and having a tubular skeleton inner portion of approximately the same length as the front propeller, the blades of the rear propeller projecting beyond the blades of the front propeller.

In testimony whereof I affix my signature.

WILLIAM D. HUBERT. [L. S.]